United States Patent
Nishiki et al.

(10) Patent No.: US 7,039,260 B2
(45) Date of Patent: May 2, 2006

(54) METHOD AND APPARATUS FOR GENERATING CARRIER SUPPRESSED OPTICAL PULSE TRAIN AND GRATING DEVICE

(75) Inventors: Akihiko Nishiki, Tokyo (JP); Masanori Hanawa, Yamanashi (JP); Hiroyuki Sasaki, Hiroshima (JP); Mikio Takahara, Yamanashi (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 242 days.

(21) Appl. No.: 10/358,316

(22) Filed: Feb. 5, 2003

(65) Prior Publication Data

US 2003/0161581 A1    Aug. 28, 2003

(30) Foreign Application Priority Data

Feb. 27, 2002    (JP)    ............... 2002-051307

(51) Int. Cl.
*G02F 1/295* (2006.01)
(52) U.S. Cl. .............. 385/10; 385/37; 385/18; 385/96
(58) Field of Classification Search .......... 385/10, 385/37, 3, 18; 372/96
See application file for complete search history.

(56) References Cited

U.S. PATENT DOCUMENTS

| | | | |
|---|---|---|---|
| 3,970,959 A * | 7/1976 | Wang et al. | 372/96 |
| 5,361,130 A | 11/1994 | Kersey et al. | |
| 5,647,039 A * | 7/1997 | Judkins et al. | 385/37 |
| 5,974,209 A | 10/1999 | Cho et al. | |
| 6,046,841 A | 4/2000 | Mahgerefteh et al. | |
| 6,185,230 B1 * | 2/2001 | Waarts | 372/6 |
| 6,292,282 B1 * | 9/2001 | Mossberg et al. | 398/99 |
| 6,594,421 B1 * | 7/2003 | Johnson et al. | 385/37 |
| 6,813,447 B1 * | 11/2004 | Ellis et al. | 398/155 |
| 2005/0031002 A1 * | 2/2005 | Botez | 372/50 |

FOREIGN PATENT DOCUMENTS

WO    WO 01/50641    7/2001

OTHER PUBLICATIONS

Miyamoto et al., "320 Gbit/s 98x40 Gbits) WDM Transmission Over 367-km Zero-Dispersion-Flattened Line With 120-km Repeater Spacing Using Carrier-Suppressed Return-To-Zero Pulse Format" Optical Society of America, pp. 216 249, (1999).

(Continued)

*Primary Examiner*—Kaveh Cyrus Kianni
(74) *Attorney, Agent, or Firm*—Venable LLP; Michael A. Sartori; Catherine M. Voorhees (57) ABSTRACT

A method for generating an optical pulse train includes generating a source optical pulse train having a predetermined pulse period; optically combining a plurality of uniform pitch grating waveguides having a substantially identical Bragg wavelength and λ/4-phase-shift waveguides in an alternating sequence so as to form a multiple λ/4-phase-shift grating waveguide; inputting the source optical pulse train from one end of the multiple λ/4-phase-shifted grating waveguide; and extracting reflected optical pulses by the plurality of uniform pitch grating waveguides from the one end of the multiple λ/4-phase-shifted grating waveguide.

10 Claims, 13 Drawing Sheets

OTHER PUBLICATIONS

Konishi et al., "Simultaneously Generated Carrier Suppressed RZ Signals Using A Single Supercontinuum Source". The Institute of Electronics. Technical Report of IEICE. OCS2001-69, pp. 25-29, (2001).

Sato et al., "Mode-Locked Lasers For 43-Gb s Carrier-Suppressed Return-To-Zero Pulse Generation", 27$^{th}$ European Conference On Optical Communication, ECOC. (2001).

* cited by examiner

METHOD AND APPARATUS FOR GENERATING CARRIER SUPPRESSED OPTICAL PULSE TRAIN AND GRATING DEVICE

BACKGROUND OF THE INVENTION

1. Field of the Invention

The present invention relates to a method and apparatus for generating a train of carrier suppressed optical pulses, and a grating device.

2. Description of the Related Art

In recent years, communication traffic demands are rapidly increasing due to a proliferation of the Internet, and high speed and large capacity transmission systems at transmission rates of 1 terabits per second (1 Tbit/s=1×10$^{12}$ bits/s) or higher are becoming commercially practical. To implement the transmission rate of the order of terabits, a wavelength division multiplexing (WDM) technique is indispensable. Particularly, attention is directed to a dense WDM (DWDM) system which densely arranges wavelengths of optical carriers (channels) with narrower wavelength intervals. However, the DWDM system implies a problem in a deterioration of transmission characteristics due to nonlinear effects such as overlapping (cross-talk) of spectra, inter-phase modulation, and the like between adjacent channels.

Noted as a method for solving this problem is a transmission system which employs a carrier suppressed return-to-zero (CS-RZ) signal that has a narrower spectrum bandwidth than a conventional RZ (Return-to-Zero) signal and exhibits a high tolerance to the nonlinear effects. The CS-RZ signal is generated, for example, by a method which uses a Mach-Zender (MZ) phase modulator, for example, described in a paper entitled "320 Gbit/s (8×40 Gbit/s) WDM Transmission over 367-km Zero-Dispersion-Flattened Line with 120-km Repeater Spacing Using Carrier Suppressed Return-to-Zero Pulse Format" by Y. Miyamoto et al. (OAA '99, PDP4, 1999). Alternatively, the CS-RZ signal is generated by a method which uses a phase shifter and a delay line, for example, described in a paper entitled "Generation of Multi-Wavelength Carrier Suppressed RZ Signal with Supercontinuum Light Source" by Konishi et al. (IEICE Technical Report, Vol. 101, No. 394, OCS2001-69, 2001). A method using a mode-locked laser is also described in a paper entitled "Mode-Locked Lasers for 43 Gb/s Carrier Suppressed Return-to-Zero Pulse Generation" by K. Sato et al. (ECOC'2001, 2001).

SUMMARY OF THE INVENTION

However, there are problems in the methods such as a large insertion loss of devices, a complicated configuration, a high cost, and the like.

The present invention has been made to solve the foregoing problems, and it is an object of the present invention to provide a method and apparatus for generating a train of carrier suppressed pulses, and a grating device which has a reduced insertion loss as well as provides high performance with a simple configuration at a low cost.

To achieve the object, according to one aspect of the present invention, there is provided a method for generating an optical pulse train, which comprises generating a source optical pulse train having a predetermined pulse period; optically combining a plurality of uniform pitch grating waveguides having a substantially identical Bragg wavelength and λ/4-phase-shift waveguides in an alternating sequence so as to form a multiple λ/4-phase-shift grating waveguide; inputting the source optical pulse train from one end of the multiple λ/4-phase-shifted grating waveguide; and extracting reflected optical pulses by the plurality of uniform pitch grating waveguides from the one end of the multiple λ/4-phase-shifted grating waveguide.

According to another aspect of the present invention, there is provided an optical pulse train generator which comprises an optical pulse source for generating a source optical pulse train having a predetermined pulse period; a λ/4-phase-shifted grating including a first and a second uniform pitch gratings having substantially identical Bragg wavelength and a λ/4-phase-shift section, the first and second uniform pitch gratings being coupled via the λ/4-phase-shift section; and an optical waveguide provided along a longitudinal direction of the λ/4-phase-shifted grating for receiving the source optical pulse train from one end of the λ/4-phase-shifted grating and guiding a reflected optical pulse train from the λ/4-phase-shifted grating.

According to another aspect of the present invention, there is provided a grating device formed with an optical grating within an optical waveguide, comprises a λ/4-phase-shifted grating including a λ/4-phase-shift section and first and second uniform pitch gratings having substantially identical Bragg wavelength, the first and second uniform pitch gratings being coupled via the λ/4-phase-shift section, wherein the first and second uniform pitch gratings have reflectivities R1, R2, respectively, at the Bragg wavelength of the first and second uniform pitch gratings, the reflectivities R1, R2 substantially satisfying R1/R2=(1−R1)$^2$.

According to another aspect of the present invention, there is provided an optical pulse train generator which comprises an optical pulse source for generating a source optical pulse train having a predetermined pulse period; a multiple λ/4-phase-shifted grating waveguide having a plurality of uniform pitch grating waveguides and λ/4-phase-shift waveguides which are optically coupled in an alternating sequence, the plurality of uniform pitch grating waveguides each reflecting the source optical pulse train; and a waveguide for inputting the source optical pulse train from one end of the multiple λ/4-phase-shifted grating waveguide and for outputting reflected optical pulses by the plurality of uniform pitch grating waveguides from the one end of the multiple λ/4-phase-shifted grating waveguide.

DETAILED DESCRIPTION OF THE INVENTION

In the following, embodiments of the present invention will be described in detail with reference to the accompanying drawings. In the drawings used in the following description, substantially equivalent components are designated the same reference numerals.

FIRST EMBODIMENT

Figure 1:
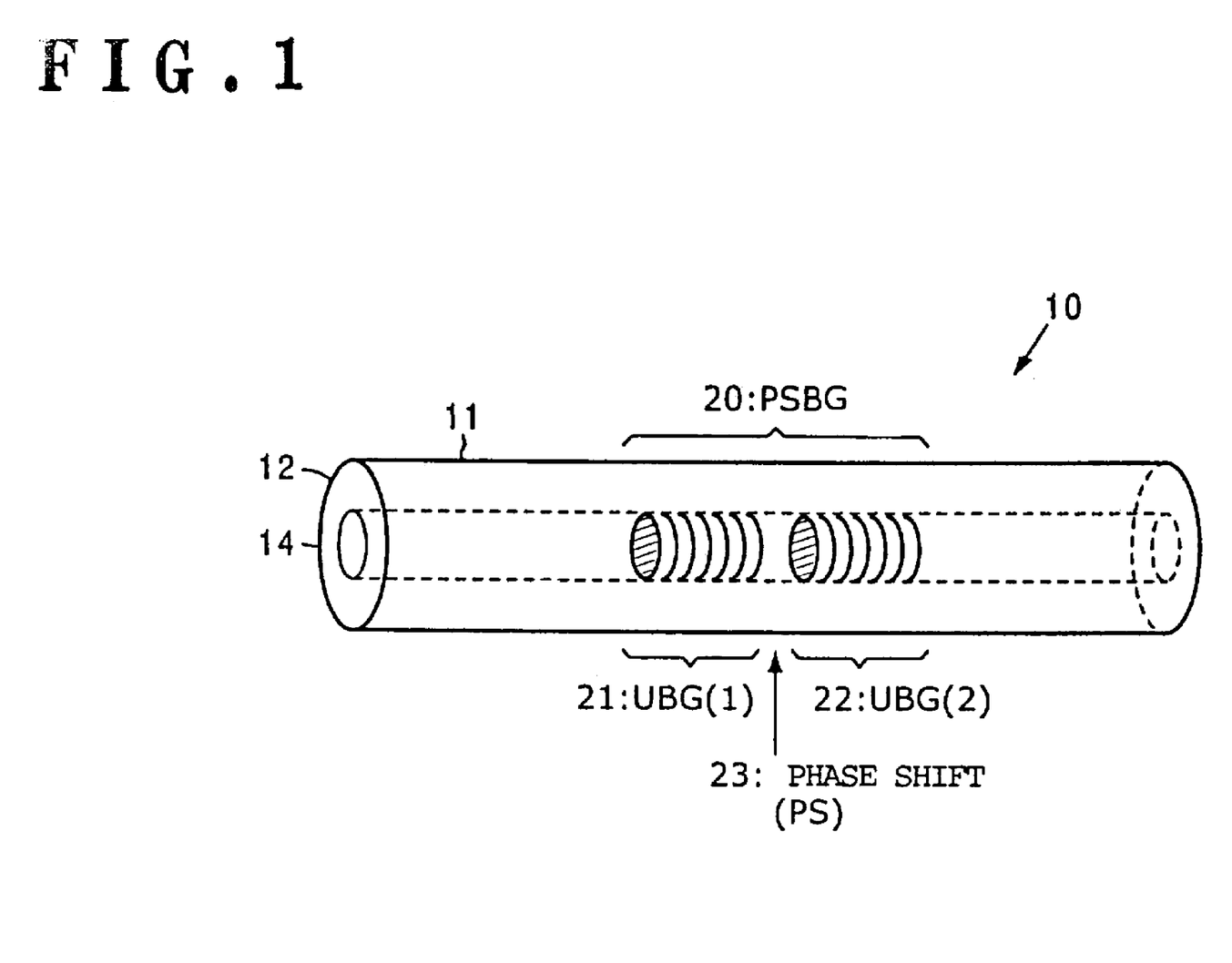
FIG. 1 is a perspective view schematically showing the structure of a phase-shifted fiber grating to which a phase-shifted grating according to the present invention is applied.

FIG. 1 is a perspective view schematically showing the structure of a phase-shifted fiber grating 10 to which a phase-shifted grating according to the present invention is applied.

The phase-shifted fiber grating 10 comprises an optical fiber 11 made up of a clad 12 and a core 14; and a phase-shifted Bragg grating (PSBG, hereinafter also simply referred as the "phase-shifted grating") 20. Specifically, a Bragg diffractive grating is formed in the optical fiber 11 by periodically changing the refractive index of the core 14 in the optical fiber 11. As described later, the phase-shifted grating 20 comprises a first and a second uniform pitch Bragg grating (hereinafter, also simply referred as the "uniform grating") UBG(1) 21, UBG(2) 22 spaced apart by a predetermined interval through a phase shift (PS) section 23. The phase-shifted grating (PSBG) 20 is formed using a phase-shift phase mask.

Figure 2:
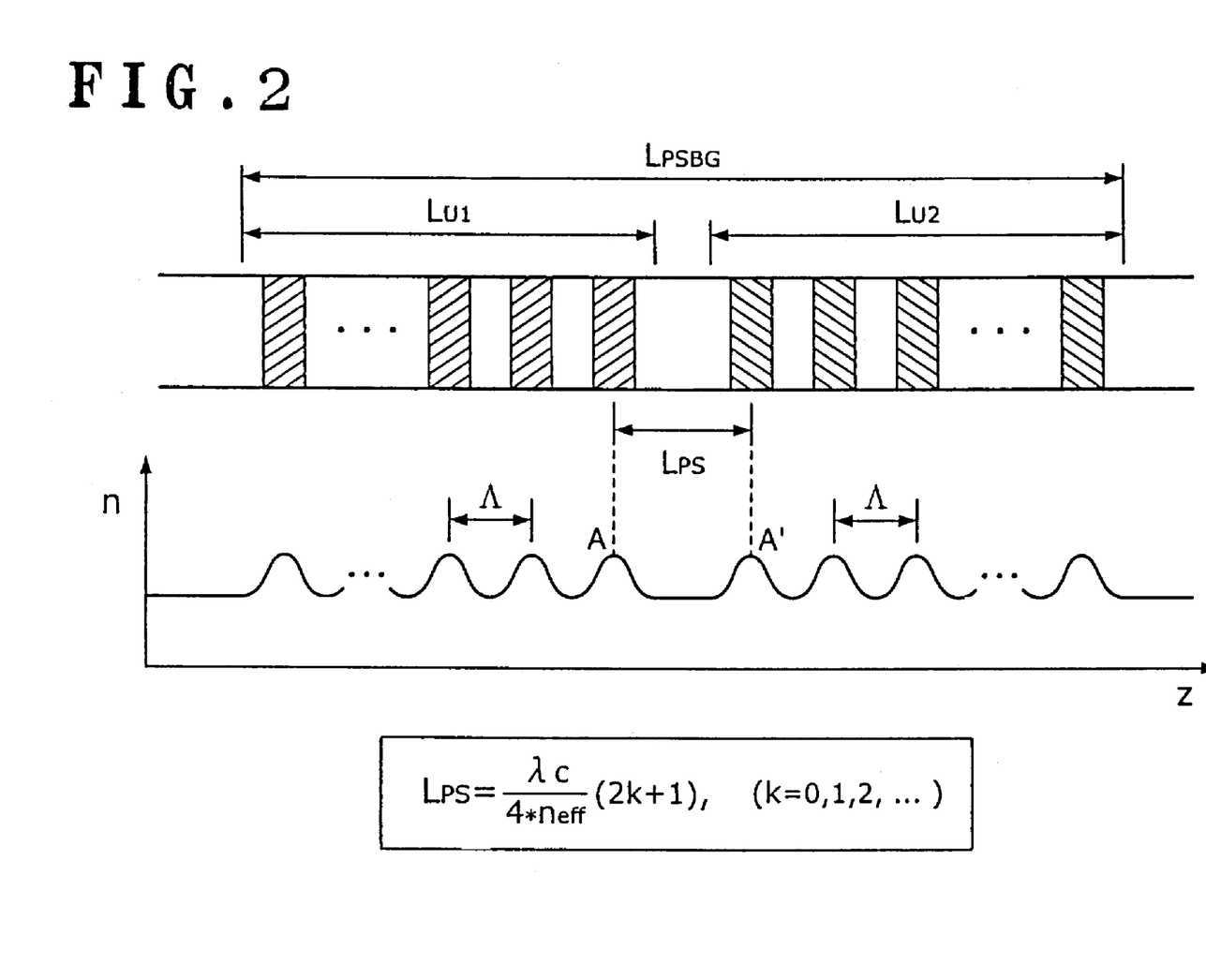
FIG. 2 is a diagram schematically showing the structure of a phase-shifted grating (PSBG) according to the present invention, and a change in a refractive index "n" along a waveguide direction (z-direction) of an optical fiber.

FIG. 2 schematically shows the structure of the phase-shifted grating (PSBG) 20 and a change in the refractive index (n) in the longitudinal direction of the optical fiber 11, i.e., in a waveguide direction (z-axis direction). As shown, the first uniform grating UBG(1) 21 has a length $L_{U1}$ and a refractive index n=n(z) which changes at a fixed pitch or period Λ (grating period). The first uniform grating UBG(1) 21 selectively reflects light at a wavelength which satisfies the Bragg condition. The second uniform grating UBG(2) 22 has a length of $L_{U2}$ and a refractive index n(z) which changes at the fixed period Λ (grating period), similar to the first uniform grating 21. The phase-shifted grating (PSBG) 20 has a length $L_{PSBG}$.

The first uniform grating UBG(1) 21 and second uniform grating UBG(2) 22 are arranged across a predetermined interval through the phase shift section (PS) 23. Specifically, the phase shift section (PS) 23 has a length $L_{PS}$ which is defined such that the phase-shifted grating (PSBG) 20 constitutes a λ/4 (quarter wave) phase-shifted structure. In other words, the PSBG 20 serves as a λ/4-phase-shifted grating.

More specifically, the length $L_{PS}$ of the phase shift section PS is expressed by the following equation:

$$L_{PS} = (2k+1) \cdot \lambda_C / 4n_{eff} \quad (1)$$

where $\lambda_C$ represents a reflection wavelength (wavelength in a vacuum) of the first and second uniform gratings UBG(1) 21, UBG(2) 22, $n_{eff}$ represents an effective refractive index in a portion of the fiber in which the phase-shifted grating (PSBG) 20 is provided, and "k" is an integer equal to or larger than zero (i.e., k=0, 1, 2, ... ). Here, $\lambda_C/n_{eff}$ in the right side of the equation represents an intra-waveguide wavelength.

Describing in a more specific manner for the structure shown in FIG. 2, the length $L_{PS}$ of the phase shift section PS 23 is given by the distance between the nearest same phase positions (positions A, A' of "peaks" of the refractive index n(z)) of the first and second uniform gratings UBG(1) 21, UBG(2) 22.

Figure 3:
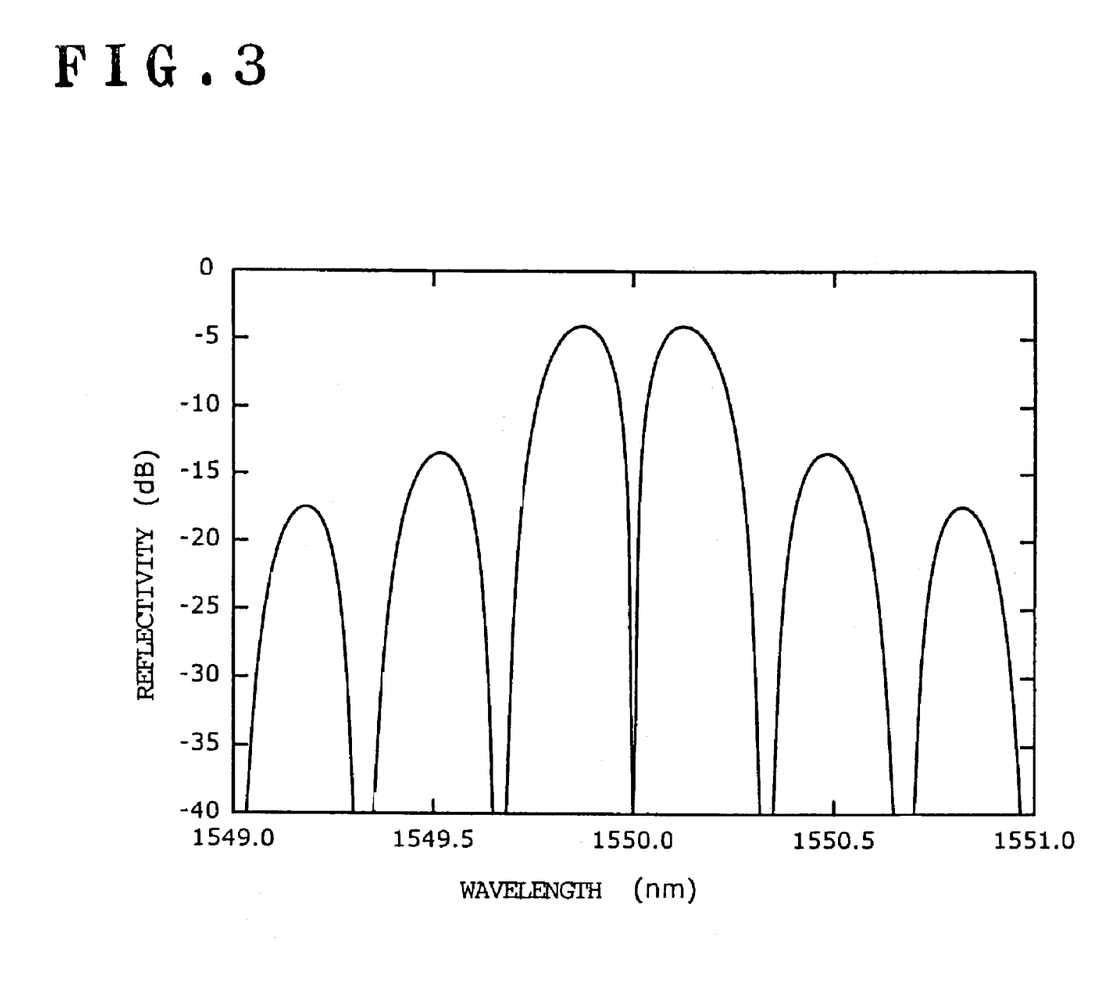
FIG. 3 is a diagram showing a reflection spectrum of a λ/4-phase-shifted grating.

When light having a wavelength $\lambda_C$ in a vacuum is input to the phase-shifted grating (PSBG) 20, the difference in phase of reflected light from the first and second uniform gratings UBG(1) 21, UBG(2) 22 can be adjusted by changing the length $L_{PS}$ of the phase shift section (PS) 23. As described above, the phase difference can be set to π by designing the phase-shifted grating (PSBG) 20 to be the λ/4-phase-shifted structure. As shown in FIG. 3, the reflection spectrum of a grating having such a λ/4-phase-shifted structure exhibits a region where the reflectivity abruptly drops at the Bragg wavelength.

When the uniform Bragg gratings UBG(1) 21, UBG(2) 22 are first-order gratings, a λ/4-phase-shift corresponds to Λ/2 (where Λ represents the grating period). However, the gratings are not limited to the first-order gratings but may be constituted as higher-order gratings.

Also, in the embodiment, description was given when the first and second uniform gratings UBG(1) 21, UBG(2) 22 have a sinusoidal profile of refractive index as shown in FIG. 2. However, the refractive index profile is not necessarily sinusoidal. Specifically, the UBG(1) 21 and UBG(2) 22 are required to have a refractive index which changes at a fixed period and to serve as Bragg gratings. For example, they may have a rectangular profile, a triangular profile or the like of refractive index distribution.

Figure 4:
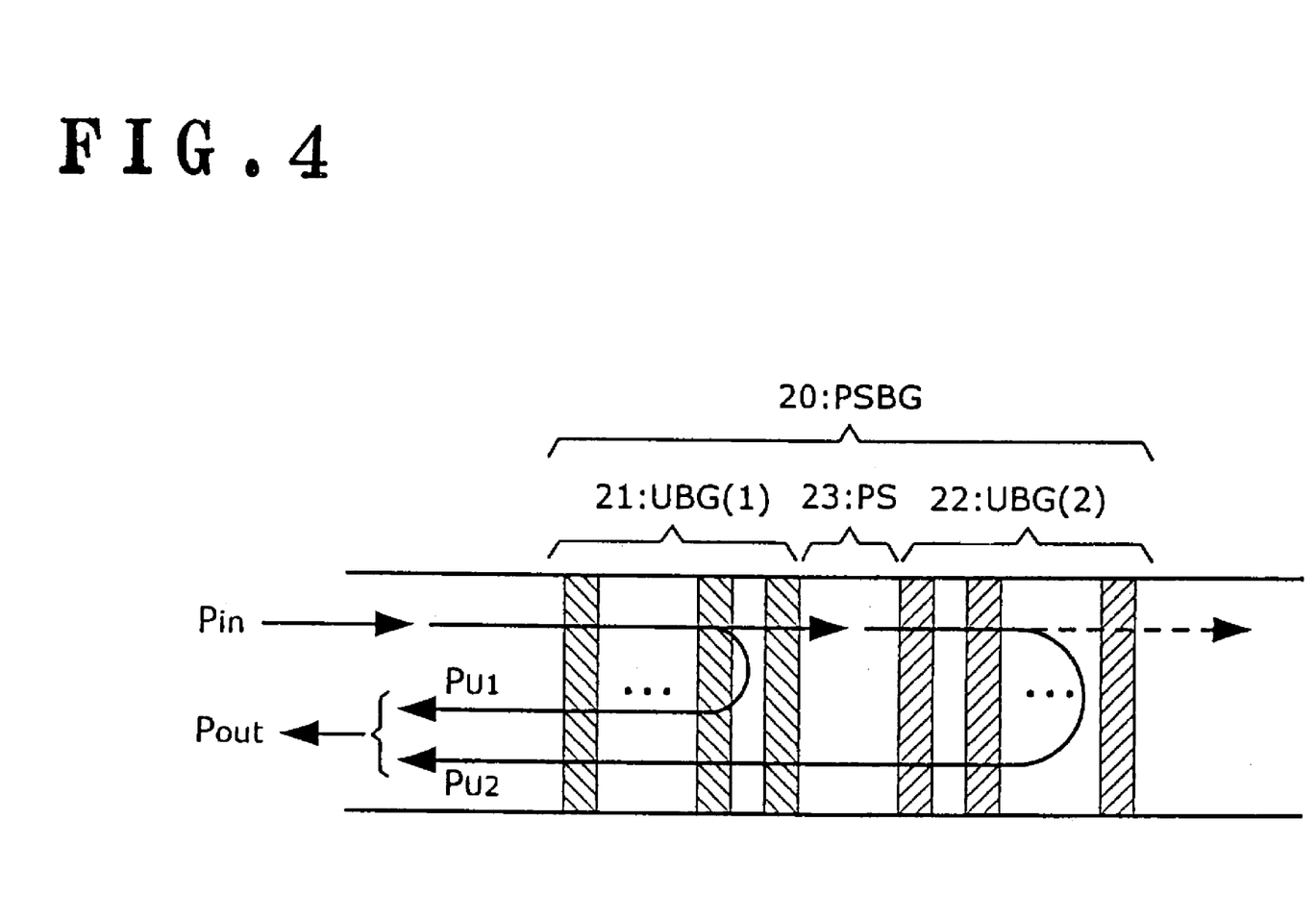
FIG. 4 is a diagram schematically showing reflection of input light by UBG(1), UBG(2) of the phase-shifted grating (PSBG)
Figure 5:
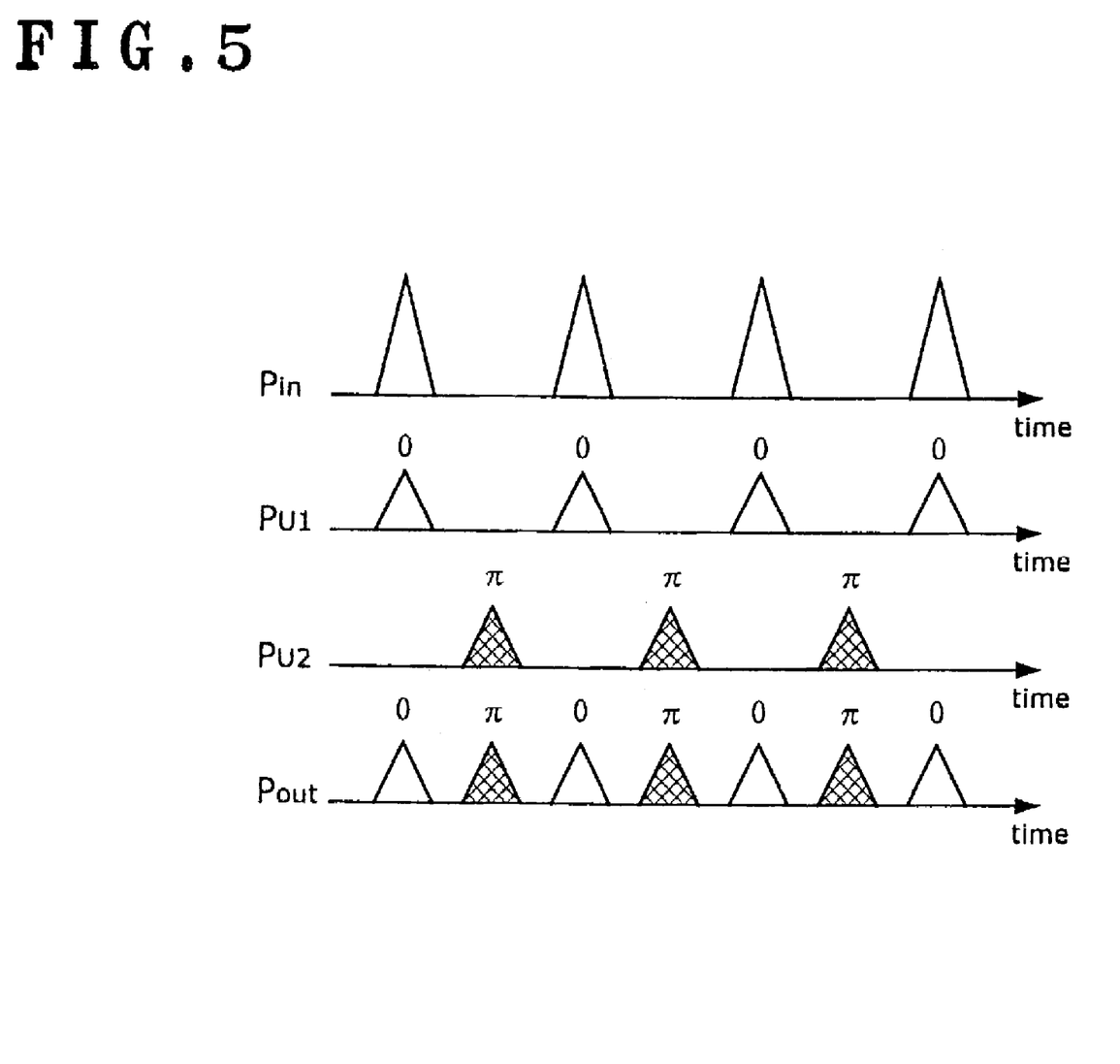
FIG. 5 is a diagram showing an input light pulse train Pin, reflected light pulse trains $P_{U1}$, $P_{U2}$ from UBG(1) and UBG(2), and a reflected light pulse train Pout from the phase-shifted grating PSBG.

Referring to FIGS. 4 and 5, the following description will be focused on the principles for generating a carrier suppressed RZ (CS-RZ) signal using the aforementioned phase-shifted grating (PSBG) 20. When an RZ optical pulse train of the same carrier wavelength as the Bragg wavelength of the PSBG 20 is input into the PSBG 20, a carrier component of the optical pulse train transmits through the PSBG 20, so that the carrier component is not included in a reflected wave. Thus, the input optical pulse train (Pin) is partially reflected by the UBG(1) 21, and the reflected optical pulse train ($P_{U1}$) is guided in the direction opposite to the input optical pulse train Pin. A portion of the input optical pulse train Pin which transmits through the UBG(1) 21 is reflected by the UBG(2) 22. The reflected optical pulse train ($P_{U2}$) is guided in the same direction as the reflected light pulse train $P_{U1}$. In this event, as shown in FIG. 5, the reflected optical pulse train $P_{U2}$ from the UBG(2) 22 experiences a phase difference and a propagation delay with respect to the reflected optical pulse train $P_{U1}$ from the UBG(1) 21. Since the phase shift of the PSBG 20 is λ/4 (=π/2), the reflected optical pulse train PU2 has a round-trip phase shift of π when it is guided to and reflected from the UBG(2) 22. The propagation delay time can be adjusted in accordance with the interval between the respective reflection center positions of the UBG(1) 21 and UBG(2) 22, or in accordance with the lengths of the UBG(1) 21 and UBG(2) 22. For the propagation delay time to be equal to one half of the pulse period of the input optical pulse train Pin, the interval D between the reflection center positions of the first and second uniform gratings is expressed by the following equation:

$$D = c \cdot Td/2n_{eff} \qquad (2)$$

where Td is the propagation delay time, and c is the light velocity.

The reflected optical pulse train(Pout) from the λ/4-phase-shifted grating PSBG 20 is a combination of the reflected optical pulse train $P_{U1}$ from the UBG(1) 21 and the reflected optical pulse train $P_{U2}$ reflected from the UBG(2) 22 through the phase shift section PS 23 and again passing through the phase shift section PS 23. By using the PSBG 20 which is designed to satisfy the condition given by equation (2), the optical pulse train Pout has a bit-rate twice as high as that of the input optical pulse train Pin, and has optical pulses which are alternately shifted in phase by π. Thus, the reflected optical pulse train Pout from the PSBG 20 can be used as the carrier suppressed RZ(CS-RZ) optical signal.

Figure 6:
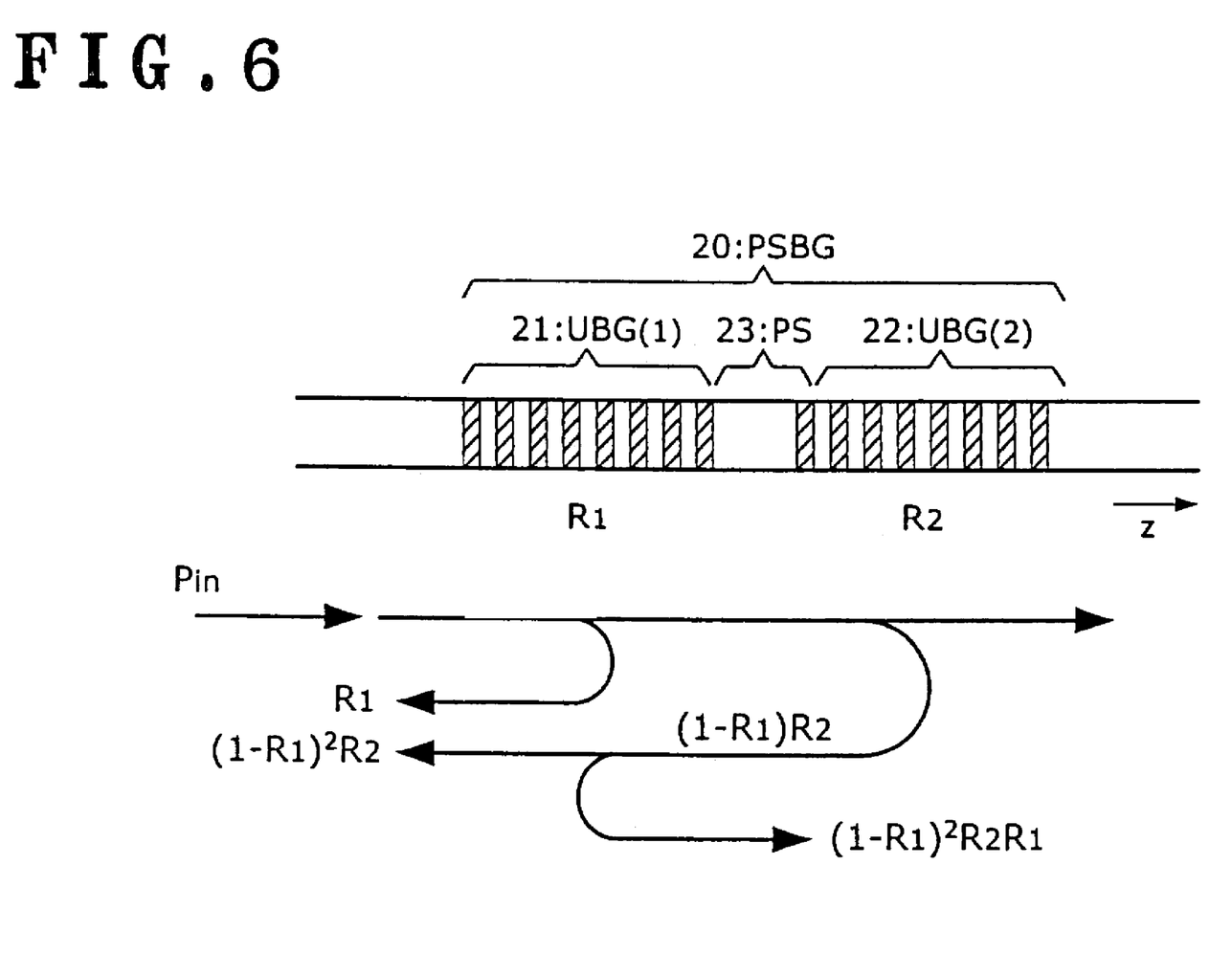
FIG. 6 is a diagram schematically showing the relationship of the light intensity between the input light pulse Pin and the reflected light pulses from the UBG(1) and UBG(2)

More specific description will be given for an example in which a CS-RZ optical signal at 40 Gbit/s is generated from an RZ optical signal at a bit-rate of 20 Gbit/s. FIG. 6 schematically shows the relation in the light intensity between the input optical pulses Pin and the reflected optical pulses from the UBG(1) and UBG(2), when the optical pulse Pin (at wavelength $\lambda_C$ in a vacuum) is input to the phase-shifted fiber grating 10. The reflectivity R of the uniform Bragg grating is determined by such parameters as a grating length L, the wavelength λ of light, a detuning amount δ between the Bragg wavelength $\lambda_B$ and the input light wavelength, and a coupling coefficient κ of the light with the grating. When the wavelength λ is equal to the Bragg grating center wavelength (i.e., when the detuning amount δ is equal to zero), the reflectivity R is expressed by the following equation:

$$R = \tan h^2(\kappa L) \qquad (3)$$

Figure 7A:
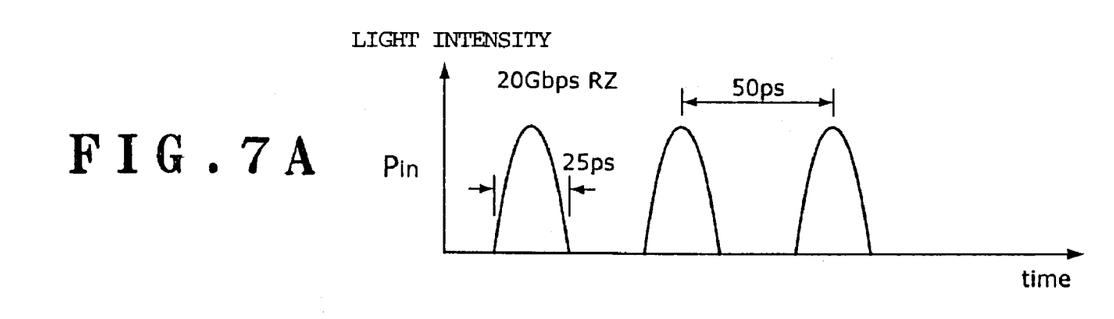
FIGS. 7A to 7C are diagrams schematically showing the input light pulse train Pin, reflected light pulse trains $P_{U1}$, $P_{U2}$ from UBG(1) and UBG(2), and reflected light pulse train Pout from the PSBG, respectively.

In this embodiment, the wavelength $\lambda_C$ (wavelength in a vacuum) of the input optical pulse train Pin is chosen to be 1550 nanometers (nm), and the Bragg wavelengths $\lambda_B$ of the UBG(1) 21 and UBG(2) 22 are also chosen to be 1550 nm. As shown in FIG. 7A, the optical pulse period is 50 picoseconds (ps), and the optical pulse width (full width) is 25 ps. The effective refractive index $n_{eff}$ of the fiber including the phase shift section PS 23 is chosen to be 1.45, and the length of the phase shift section PS 23 to be 267.2 nm. Also, as described above, a delay time of the reflected optical pulses from the UBG(2) 22 is determined by the interval between the reflection center positions of the respective UBG(1) 21 and UBG(2) 22. Here, the lengths $L_{U1}$, $L_{U2}$ of the UBG(1) 21 and UBG(2) 22 are chosen to be 2.5 millimeters (mm) (see FIG. 2), respectively, and the interval between the reflection center positions to be 2.5 mm. Also, the length $L_{U1}$, $L_{U2}$ are approximately equal to the optical path length corresponding to the full width (25 ps) of the optical pulse.

Figure 8:
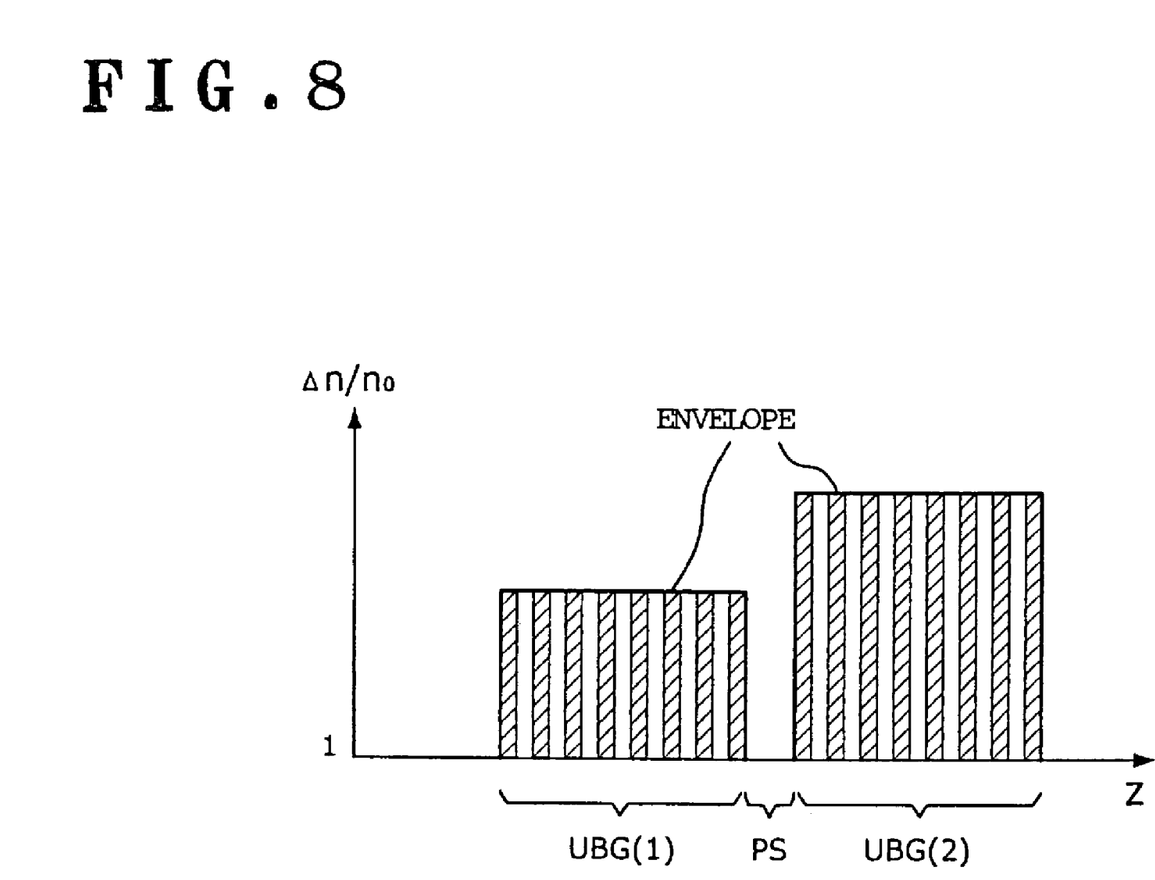
FIG. 8 is a diagram schematically showing a refractive index modulation factor of the λ/4-phase-shifted fiber grating along the axial direction.

FIG. 8 shows an envelope of a refractive index modulation factor Δn/$n_0$ ($n_0$ represents the refractive index of an optical fiber portion where no grating is formed) in the axial direction of the phase-shifted fiber grating 10. Since the aforementioned coupling coefficient κ changes in accordance with the refractive index modulation factor, the reflectivities of the UBG(1) 21 and UBG(2) 22 can be changed. The UBG(1) 21 and UBG(2) 22 are gratings which are not apodized (non-apodized gratings).

The reflected optical pulses $P_{U1}$, $P_{U2}$ from the UBG(1) 21 and UBG(2) 22 have light intensities expressed by R1, $(1-R1)^2 R2$, respectively, when the light intensity of the input optical pulses Pin is normalized to one, and the reflectivities of the UBG(1) 21 and UBG(2) 22 for the input optical pulses Pin are represented by R1, R2, respectively (see FIG. 6). Therefore, the light intensities of the reflected optical pulse trains $P_{U1}$, $P_{U2}$ can be made equal by selecting the foregoing parameters such that the reflectivities R1, R2 satisfy the following equation:

$$R1/R2 = (1-R1)^2 \qquad (4)$$

In this embodiment, the reflected optical pulse trains $P_{U1}$, $P_{U2}$ are made equal in light intensity by choosing the lengths $L_{U1}$, $L_{U2}$ to be equal and providing the UBG(1) 21 and UBG(2) 22 with different refractive index modulation factors.

Figure 7B:
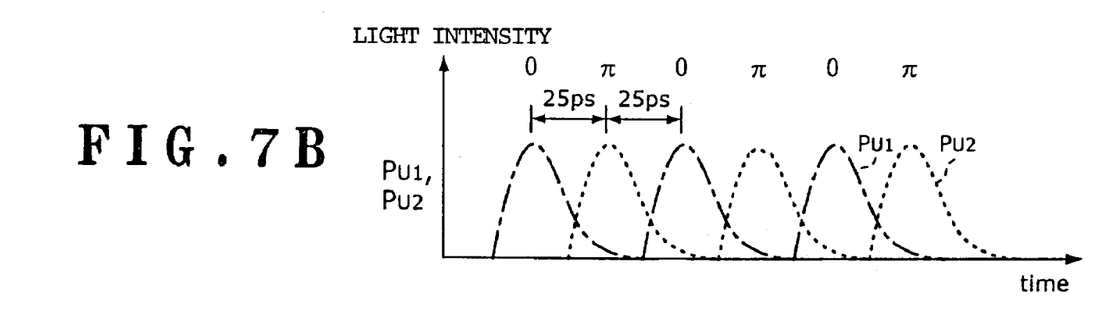
Figure 7C:
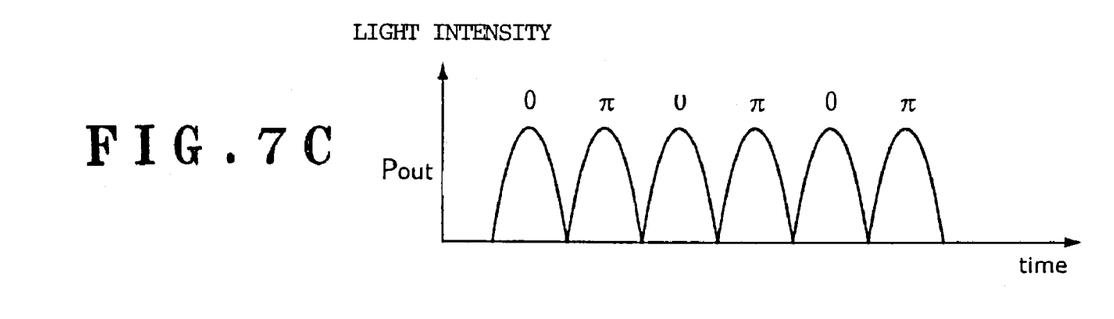

As shown in FIG. 7B, among the reflected light from the phase-shifted grating PSBG 20, the reflected optical pulse train $P_{U2}$ (broken line) from the UBG(2) 22 deviates in phase from the reflected optical pulse train $P_{U1}$ (one-dot chain line) from the UBG(1) 21 by π, while the reflected optical pulse trains are approximately equal in light intensity. The interval between respective optical pulses is substantially constant (25 ps). The pulse widths of optical pulses in the reflected optical pulse trains $P_{U1}$, $P_{U2}$ are increased by reflection, and partially overlap each other. However, since adjacent optical pulses deviate in phase by π from each other, overlapping optical pulses cancel out, resulting in a non-overlapping optical pulse train (Pout) as shown in FIG. 7C. Therefore, the optical pulse train Pout is a carrier suppressed RZ(CS-RZ) optical signal which has a bit-rate (40 Gbit/s) twice as high as that of the input optical pulse train Pin.

In the embodiment, the UBG(1) 21 and UBG(2) 22 are designed to have different reflectivities R1, R2 to make the light intensities of the reflected optical pulses $P_{U1}$, $P_{U2}$ to be equal. However, the reflectivities may be designed to be the same (i.e., R1=R2).

SECOND EMBODIMENT

Figure 9:
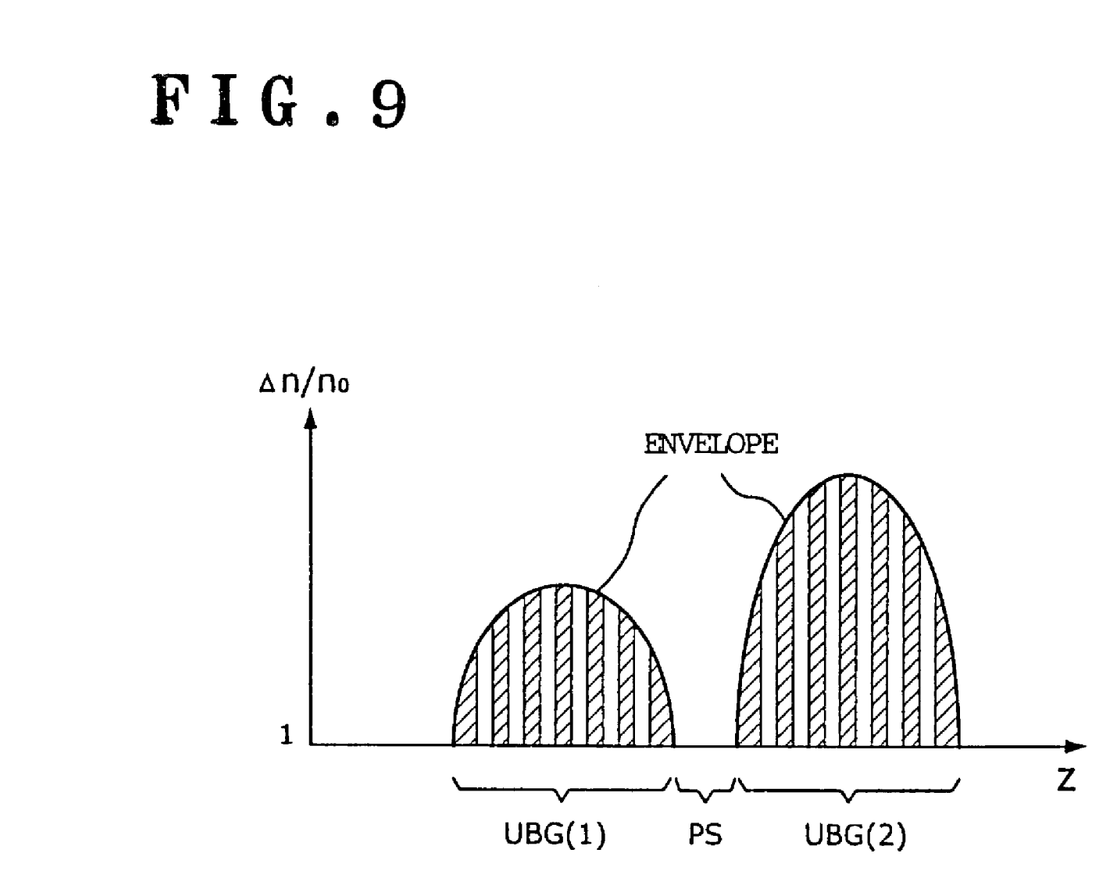
FIG. 9 is a diagram schematically showing an axial refractive index modulation factor of a λ/4-phase-shifted fiber grating having an apodized grating according to a second embodiment of the present invention.

FIG. 9 schematically illustrates an envelope of a refractive index modulation factor of a λ/4-phase-shifted grating PSBG 20 according to a second embodiment of the present invention. Specifically, an uniform grating UBG(1) 21 has a refractive index modulation factor reduced at both ends in the longitudinal direction of an optical fiber 11. In other words, UBG(1) 21 is configured as an apodized grating. Similarly, the uniform grating UBG(2) 22 is configured as an apodized grating. The apodized gratings result in an improvement in time-axis broadening of reflected pulses by the gratings.

As described above, when the uniform grating UBG(1) 21, UBG(2) 22 are not apodized, adjacent optical pulses cancel out each other because the pulses are in an inverted phase relation as shown in FIG. 7B. However, the optical power is lost. The uniform gratings UBG(1) 21 and UBG(2) 22 are both apodized to prevent the power loss.

In the second embodiment, the uniform gratings UBG(1) 21 and UBG(2) 22 are both apodized, but either one of the gratings may be apodized.

In addition, the overlapping of optical pulses can be reduced by decreasing the full optical pulse width of the input optical pulse train Pin to be one half of the pulse period or less, or by decreasing the full width at half maximum (FWHM) of the optical pulses to be one quarter of the pulse period or less.

THIRD EMBODIMENT

Figure 10:
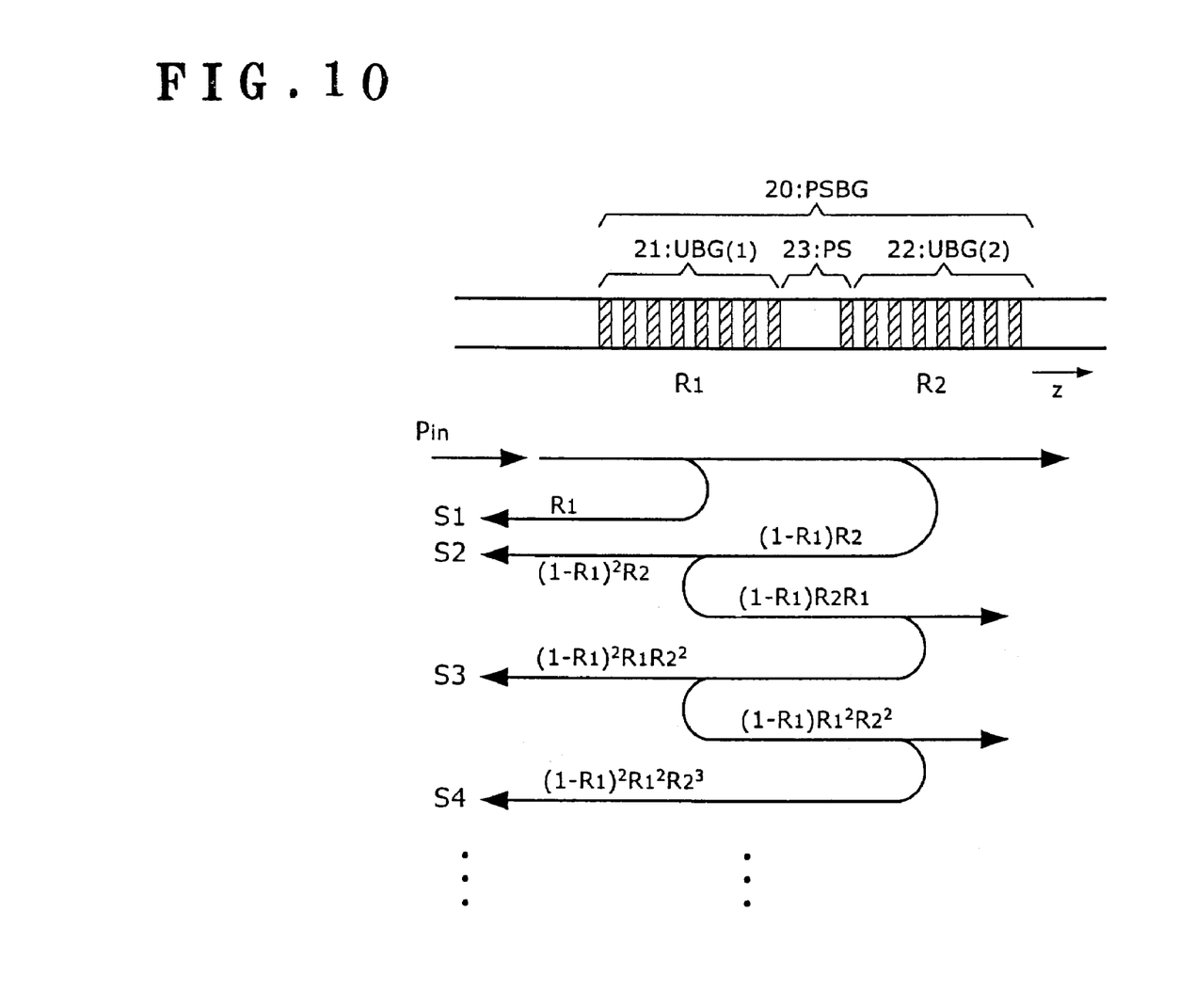
FIG. 10 is a diagram schematically showing multiple reflections by the UBG(1) and UBG(2) of the input light pulse train Pin.
Figure 11:
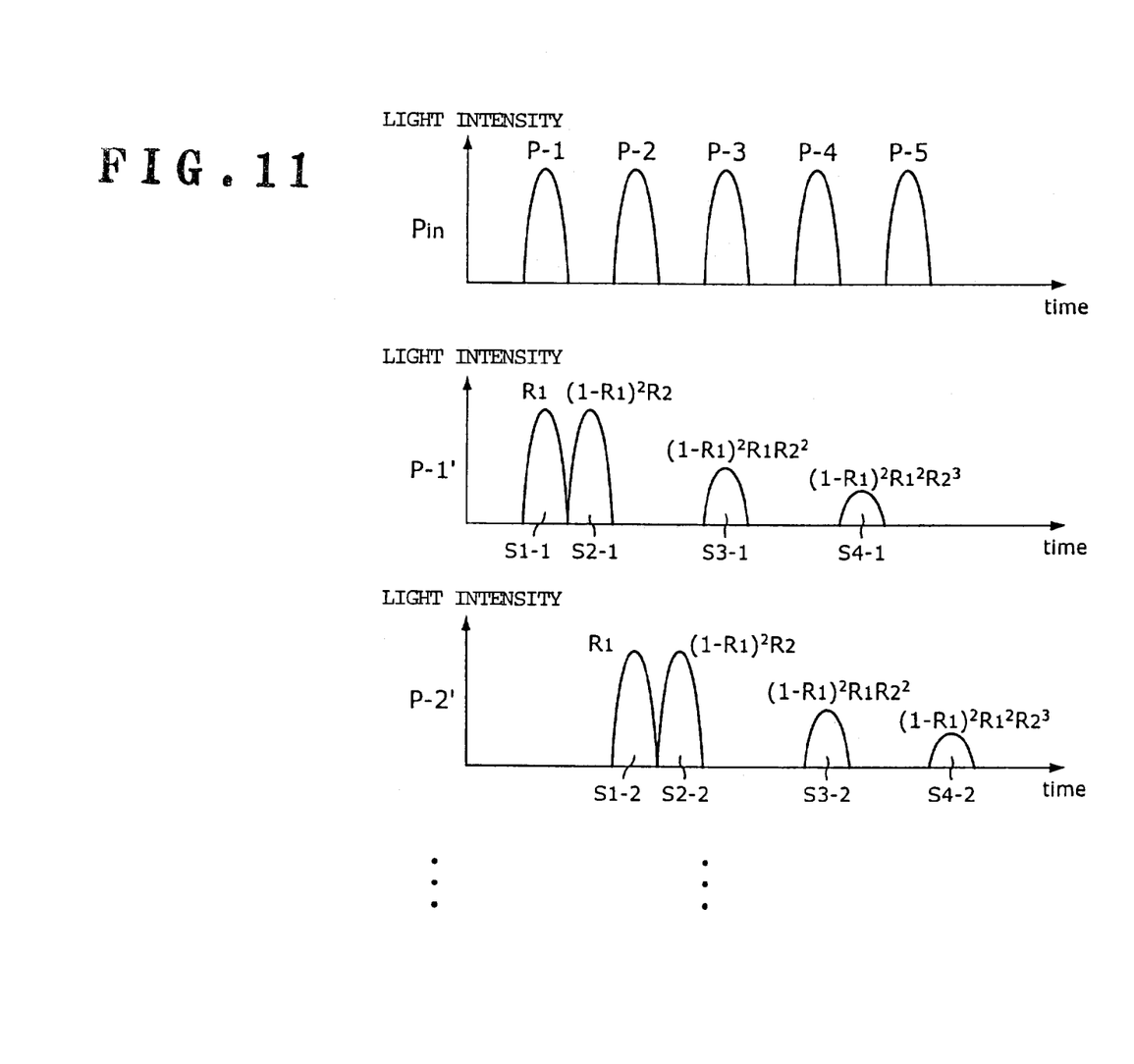
FIG. 11 is a diagram schematically showing interference of light pulses due to multiple reflections.

A third embodiment of the present invention will be described below. Since a phase-shifted grating operates as a wavelength selection Fabry-Perot resonator, multiple reflections may occur. FIG. 10 illustrates multiple reflections by the UBG(1) 21 and UBG(2) 22 for the input optical pulse train Pin. FIG. 11 illustrates interference of optical pulses due to the multiple reflections. As shown in FIG. 10, the multiple reflections for the optical pulse train Pin result in reflected optical pulse trains S1, S2, S3, S4, . . . When the light intensity of the input optical pulse train Pin is normalized to one, intensities of the reflected light are expressed by $S1=R1$, $S2=(1-R1)^2 R2$, $S3=(1-R1)^2 R1 R2^2$, . . . Describing individual optical pulses, a multiple-reflection optical pulse train P-1' comprised of multiple reflection optical pulses S1-1, S2-1, S3-1, S4-1, . . . is produced for the first optical pulse P-1 of the optical pulse train Pin, as shown in FIG. 11. Also, a multiple-reflection optical pulse train P-2' comprised of multiple reflection optical pulses S1-2, S2-2, S3-2, S4-2, . . . is produced for the second optical pulse P-2 of the optical pulse train Pin. Similarly, multiple-reflection optical pulses are produced for the respective optical pulses P-3, P-4, . . . of the optical pulse train Pin. These multiple-reflection optical pulses interfere with each other to cause coherent cross-talk. The coherent cross-talk increases as the reflectivities of the UBG(1) 21 and UBG(2) 22 increases. Therefore, the reflectivities of the UBG(1) 21 and UBG(2) 22 are determined to prevent the coherent cross-talk from affecting the transmission characteristic. For example, in order to limit a power penalty to 1 dB or less after transmission, the reflectivities R1, R2 of the UBG(1) 21 and UBG(2) 22 may be determined to satisfy that the ratio of the intensity of an interfering signal to the intensity of a main signal is equal to or less than −30 dB, i.e., so as to satisfy the following equation:

$$R1 \times R2 \leq 10^{-3} \tag{5}$$

A grating device can be provided for generating a carrier suppressed optical pulse signal having a high transmission performance by forming the phase-shifted grating PSBG 20 so as to satisfy the condition.

FOURTH EMBODIMENT

Figure 12:
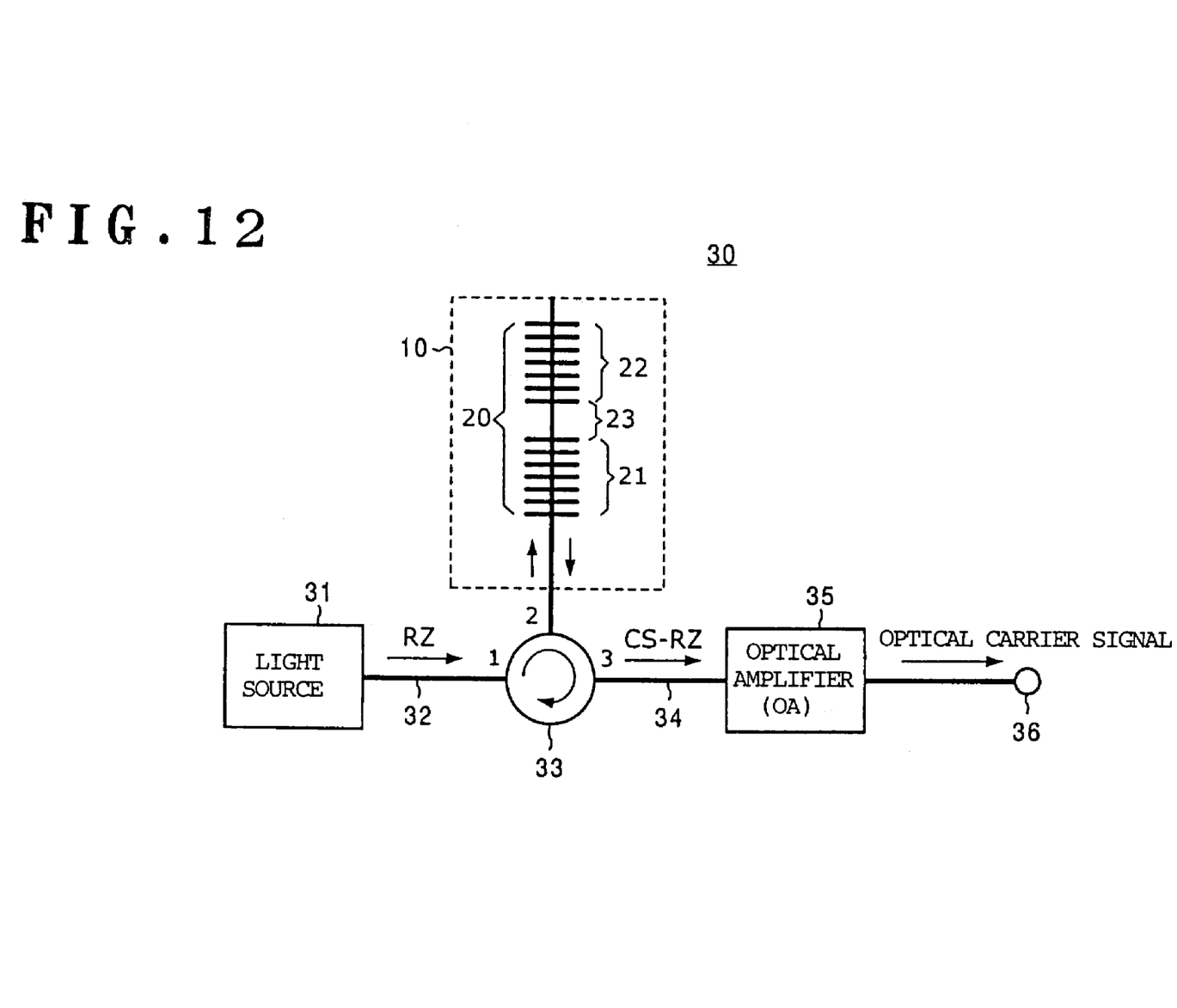
FIG. 12 is a block diagram showing the configuration of a carrier suppressed CS-RZ optical signal generator to which the λ/4-phase-shifted grating according to a fourth embodiment of the present invention is applied.

FIG. 12 is a block diagram showing the configuration of a carrier-suppressed optical carrier signal (CS-RZ signal) generator 30 of a fourth embodiment of the present invention to which the λ/4-phase-shifted grating PSBG 20 is applied.

A light source 31 generates an optical pulse train (RZ signal) having a predetermined pulse period. The light source 31 employs, for example, a mode lock laser or the like for generating an RZ optical signal which has a wavelength $\lambda_C$ of 1550 nm (wavelength in a vacuum), an optical pulse width (FWHM) of 12.5 ps, and a bit-rate equal to 20 Gbit/s. The generated RZ optical signal is supplied to a first port of an optical circulator 33 through an optical fiber 32. The RZ optical signal is output from a second port of the optical circulator 33, and supplied to a λ/4-phase-shifted fiber grating 10. In the λ/4-phase-shifted fiber grating 10, the UBG(1) 21 and UBG(2) 22 have the Bragg wavelength $\lambda_B$ of 1550 nm, and a length of 2.5 mm. The phase shift section PS 23 has the length of 267.2 nm.

A CS-RZ optical signal at 40 Gbit/s is produced as a reflected optical pulse train from the phase-shifted fiber grating 10. The CS-RZ optical signal is supplied to an optical amplifier (OA) 35 for amplification through the optical circulator 33. For example, the optical amplifier (OA) 35 can be implemented by an optical fiber amplifier such as an Erbium-doped fiber amplifier, or a variety of optical amplifiers such as a semiconductor amplifier. The CS-RZ optical signal amplified to a predetermined signal level by the optical amplifier (OA) 35 is output from an output terminal 36. The CS-RZ optical signal is used as a carrier suppressed optical signal. In addition, a plurality of CS-RZ signal generators 30 having different wavelengths may be provided to serve as carrier light sources for WDM.

Figure 13:
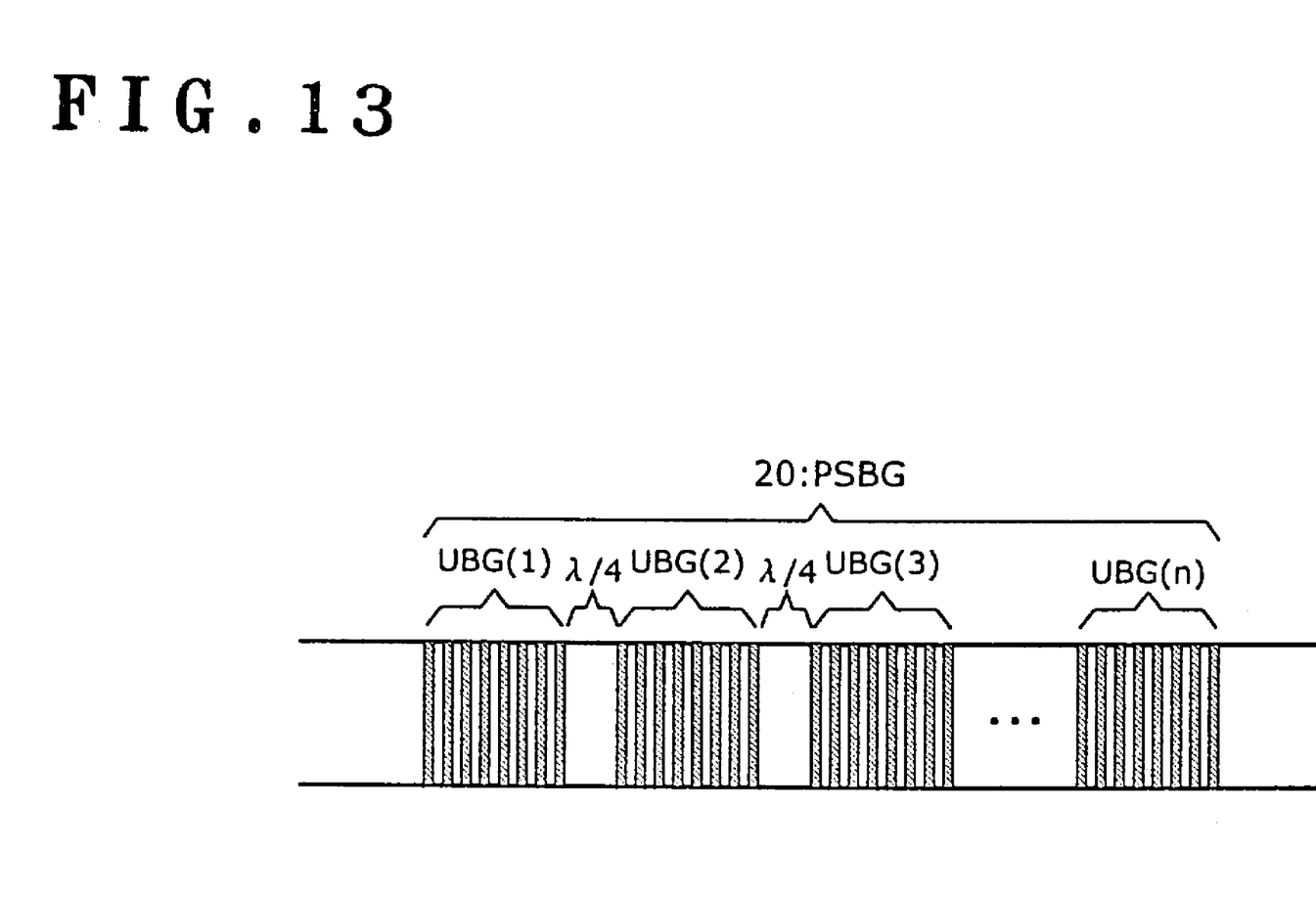
FIG. 13 is a diagram showing the structure of a λ/4-phase-shifted grating which has a plurality of uniform gratings sequentially coupled through λ/4-phase-shift sections.

The embodiments of the present invention have been described above in detail. While the foregoing embodiments have described in accordance with the λ/4-phase-shifted grating 20 comprised of the two uniform gratings UBG(1) 21 and UBG(2) 22, the present invention is not limited to this particular configuration. As shown in FIG. 13, λ/4-phase-shifted grating may be configured so as to include a plurality of uniform gratings UBG(1), UBG(2), . . . , UBG(n). The plurality of uniform pitch grating waveguides and λ/4-phase-shift waveguides are optically coupled in an alternating sequence. In other words, the plurality of uniform gratings UBG(1), UBG(2), . . . , UBG(n) are sequentially coupled via λ/4-phase-shift sections or waveguides, in which each of the λ/4-phase-shift waveguides is provided between the adjacent uniform gratings, so as to form a multiple λ/4-phase-shift grating waveguide.

The Bragg wavelengths of the plurality of uniform pitch gratings may be determined such that each of the plurality of uniform pitch gratings reflects the input optical pulses.

The phase-shifted grating (PSBG) waveguide is not necessary configured as an optical fiber grating. The phase-shifted grating waveguide may be configured to be planar channel optical waveguide or planar lightwave circuit (PLC).

Also, while the foregoing embodiments have been described for an example in which the first and second uniform gratings UBG(1) 21 and UBG(2) 22 have the same length, the present invention is not limited to this particular configuration. As described above, a propagation delay time or a pulse interval of the reflected pulse train from the UBG(2) 22 can be adjusted in accordance with the interval between the reflection center positions of the respective UBG(1) 21 and UBG(2) 22. On the other hand, since the reflectivity of the grating is increased as the product (κL) of the grating length L and coupling coefficient κ is increased, the reflectivity of the UBG(2) 22 can be increased, for example, by forming the grating UBG(2) 22 at the latter stage longer than the grating UBG(1) 21 provided nearer to the light input end. Thus, the reflectivities of the UBG(1) 21 and UBG(2) 22 can be adjusted without varying the coupling coefficients κ, or the refractive index modulation factors thereof. Therefore, the UBG(1) 21 and UBG(2) 22 maybe designed to have the same coupling coefficient or refractive index modulation factor. Alternatively, the UBG (1) 21 and UBG(2) 22 may be designed to have different refractive index modulation factors and different grating lengths. When taking into account of an optical pulse waveform including a broadening of optical pulse, the length of the grating UBG(2) 22 provided at the latter stage may be made shorter than that of the grating UBG(1) 21 provided nearer to the light input end to prevent deterioration of the pulse waveform.

While the foregoing embodiments have been described in the context of the generation of optical pulses in a 1550 nm band, the present invention is not limited to the wavelength band. For example, the present invention can be applied as well to any wavelength band, for example, a 1310 nm band and the like.

As described above, according to the present invention, there can be provided a high-performance, low manufacturing cost grating device which has a reduced insertion loss as well as a simple configuration, and a method and apparatus for generating a train of carrier suppressed pulses.

The present invention has been described with reference to the preferred embodiments thereof. It should be understood by those skilled in the art that a variety of alterations and modifications may be made from the embodiments described above. It is therefore contemplated that the appended claims encompass all such alterations and modifications.

What is claimed is:

1. An optical pulse train generator comprising:
an optical pulse source for generating a source optical pulse train having a predetermined pulse period;
a λ4-phase-shifted grating including a first and a second uniform pitch gratings having substantially identical Bragg wavelength and a λ4-phase-shift section, said first and second uniform pitch gratings being coupled via said λ4-phase-shift section; and
an optical waveguide provided along a longitudinal direction of said λ4-phase-shifted grating so as to constitute a λ4-phase shifted grating waveguide for receiving said source optical pulse train from one end of said λ4-phase-shifted grating waveguide and guiding a reflected optical pulse train to be output from said one end of λ4-phase-shifted grating waveguide, so that the pulses of the reflected optical pulse train alternate in phase by π.

2. An optical pulse train generator according to claim 1, wherein said first and second uniform pitch gratings are arranged such that pulse intervals of the reflected optical pulse train are substantially constant.

3. An optical pulse train generator according to claim 1, wherein said first and second uniform pitch gratings have reflectivities such that respective optical pulses of said reflected optical pulse train have substantially identical optical intensity.

4. An optical pulse train generator according to claim 1, wherein each of said first and second uniform pitch gratings has a length equal to or less than an optical path length corresponding to an optical pulse time-width of said source optical pulse train.

5. An optical pulse train generator according to claim 1, wherein said source optical pulse train has a full optical pulse width equal to or less than one half of the predetermined pulse period.

6. An optical pulse train generator according to claim 1, wherein said first and second uniform pitch gratings have reflectivities $R1$, $R2$, respectively, for said source optical pulse train, said reflectivities $R1$, $R2$ substantially satisfying:

$$R1/R2=(1-R1)^2.$$

7. An optical pulse train generator according to claim 1, wherein at least one of said first and second uniform pitch gratings is an apodized grating.

8. An optical pulse train generator according to claim 1, wherein said first and second uniform pitch gratings have reflectivities $R1$, $R2$, respectively, for said source optical pulse train, the product of said reflectivities $R1$, $R2$ substantially satisfying:

$$R1 \times R2 \leq 10^{-3}.$$

9. An optical pulse train generator according to claim 1, wherein said optical waveguide is an optical fiber.

10. An optical pulse train generator according to claim 1, wherein said optical waveguide is a planar channel optical waveguide.

* * * * *